(12) United States Patent
Edwards et al.

(10) Patent No.: US 12,051,164 B2
(45) Date of Patent: Jul. 30, 2024

(54) AUGMENTED REALITY AT A FRONT-END DEVICE

(71) Applicant: Capital One Services, LLC, McLean, VA (US)

(72) Inventors: Joshua Edwards, Philadelphia, PA (US); Michael Mossoba, Great Falls, VA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 72 days.

(21) Appl. No.: 17/931,645

(22) Filed: Sep. 13, 2022

(65) Prior Publication Data

US 2024/0087241 A1 Mar. 14, 2024

(51) Int. Cl.
*G06T 19/00* (2011.01)
*G06F 3/01* (2006.01)
*G06V 40/20* (2022.01)

(52) U.S. Cl.
CPC .......... *G06T 19/006* (2013.01); *G06F 3/017* (2013.01); *G06V 40/28* (2022.01)

(58) Field of Classification Search
CPC ........ G06T 19/006; G06V 40/28; G06F 3/017

USPC .......................................................... 345/633
See application file for complete search history.

(56) References Cited

U.S. PATENT DOCUMENTS

| | | | |
|---|---|---|---|
| 10,685,537 B1* | 6/2020 | Moore | H04L 67/02 |
| 10,802,582 B1* | 10/2020 | Clements | G06F 3/013 |
| 11,276,050 B1 | 3/2022 | Lightowler et al. | |
| 11,558,375 B1* | 1/2023 | Cao | H04L 9/3226 |
| 2013/0063345 A1* | 3/2013 | Maeda | G06F 3/0481 |
| | | | 345/156 |
| 2017/0324726 A1* | 11/2017 | Alleaume | H04W 12/33 |
| 2017/0329458 A1* | 11/2017 | Kanemaru | G06F 3/0425 |
| 2018/0308076 A1* | 10/2018 | Jeong | G06Q 30/0601 |
| 2021/0082257 A1* | 3/2021 | Carroll | H04L 63/0861 |
| 2022/0108289 A1* | 4/2022 | Lightowler | G06Q 20/3276 |

* cited by examiner

*Primary Examiner* — Jin Ge
(74) *Attorney, Agent, or Firm* — Harrity & Harrity, LLP

(57) ABSTRACT

In some implementations, a system may receive, at a front-end device and from an augmented reality (AR) device associated with a user, a request to use the front-end device. The system may transmit, to the AR device, a request to access an optical sensor of the AR device. The system may receive, from the AR device, an output, from the optical sensor, that indicates a hand gesture performed by the user of the AR device. Accordingly, the system may determine, based on the hand gesture, a corresponding input key of the front-end device. The system may perform an action based on the corresponding input key.

20 Claims, 17 Drawing Sheets

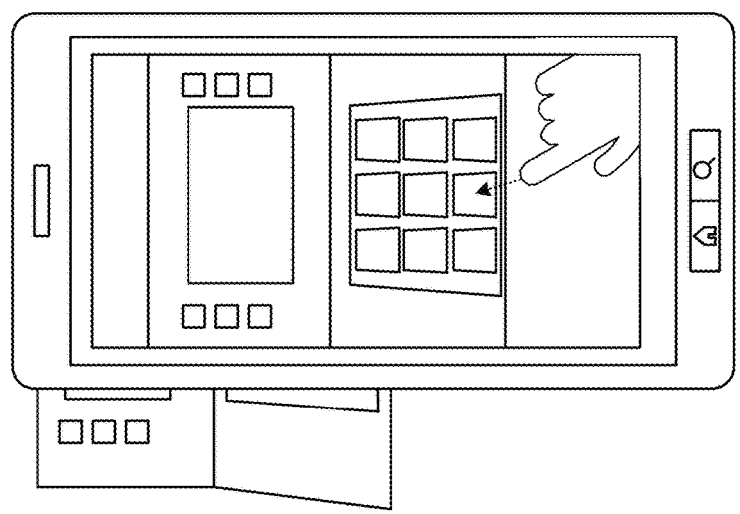

AUGMENTED REALITY AT A FRONT-END DEVICE

BACKGROUND

At front-end devices, such as automated teller machines (ATMs) or point-of-sale (PoS) terminals, security is generally increased by using two forms of verification from a user. For example, the user may provide a physical card and separately provide a personal identification number. In another example, the user may provide a physical card and separately provide a signature.

SUMMARY

Some implementations described herein relate to a system for configuring and using augmented reality at a front-end device. The system may include one or more memories and one or more processors communicatively coupled to the one or more memories. The one or more processors may be configured to identify, at the front-end device, an augmented reality (AR) device associated with a user that is a distance from the front-end device that satisfies a distance threshold. The one or more processors may be configured to establish a secure connection with the AR device using a wireless personal area network. The one or more processors may be configured to transmit, over the secure connection, a request to access an optical sensor of the AR device. The one or more processors may be configured to receive, over the secure connection, an indication of a hand gesture performed by the user of the AR device. The one or more processors may be configured to determine, based on the hand gesture, a corresponding input key of the front-end device. The one or more processors may be configured to perform an action based on the corresponding input key.

Some implementations described herein relate to a method of configuring and using augmented reality at a front-end device. The method may include receiving, at the front-end device and from an AR device associated with a user, a request to use the front-end device. The method may include transmitting, to the AR device, a request to access an optical sensor of the AR device. The method may include receiving, from the AR device, an output from the optical sensor, wherein the output indicates a hand gesture performed by the user of the AR device. The method may include determining, based on the hand gesture, a corresponding input key of the front-end device. The method may include performing an action based on the corresponding input key.

Some implementations described herein relate to a non-transitory computer-readable medium that stores a set of instructions for configuring and using augmented reality at a front-end device for a device. The set of instructions, when executed by one or more processors of the device, may cause the device to transmit, to the front-end device and from an AR device associated with a user, a request to use the front-end device. The set of instructions, when executed by one or more processors of the device, may cause the device to establish a secure connection with the AR device. The set of instructions, when executed by one or more processors of the device, may cause the device to display an augmented image of the front-end device to the user. The set of instructions, when executed by one or more processors of the device, may cause the device to capture, using an optical sensor of the AR device, a representation of a hand gesture performed by the user of the AR device. The set of instructions, when executed by one or more processors of the device, may cause the device to transmit, to the front-end device, an indication based on the representation of the hand gesture, wherein the indication is associated with a corresponding input key of the front-end device. The set of instructions, when executed by one or more processors of the device, may cause the device to perform an action based on the corresponding input key.

BRIEF DESCRIPTION OF THE DRAWINGS

FIGS. 2A-2E are diagrams of an example implementation relating to AR interfaces, in accordance with some embodiments of the present disclosure.

DETAILED DESCRIPTION

Figure 1A:
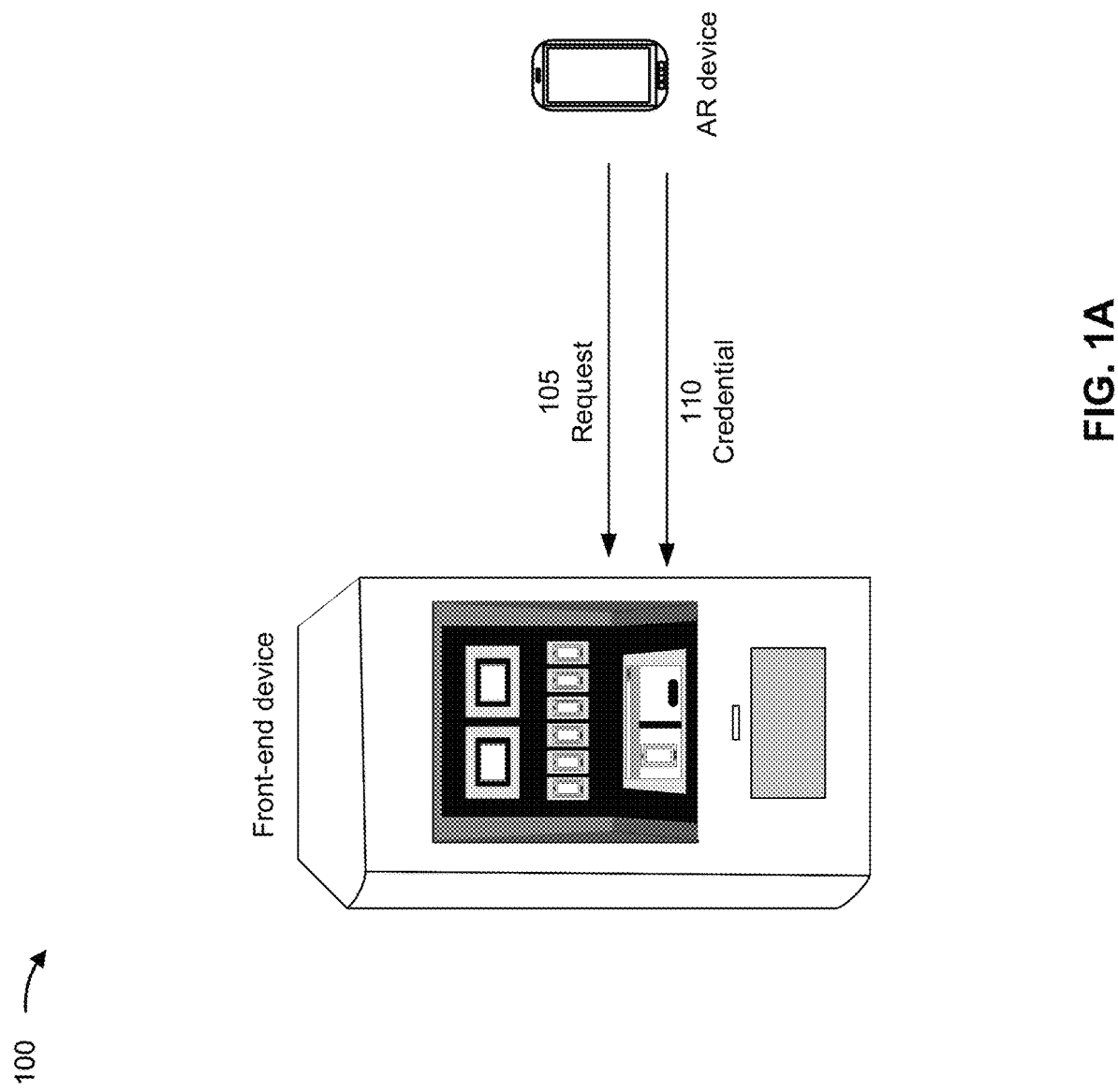
FIGS. 1A-1F are diagrams of an example implementation relating to using augmented reality (AR) at a front-end device, in accordance with some embodiments of the present disclosure.

The following detailed description of example implementations refers to the accompanying drawings. The same reference numbers in different drawings may identify the same or similar elements.

Front-end devices, such as automated teller machines (ATMs) or point-of-sale (PoS) terminals, generally increase security by using two forms of verification. For example, a user may provide a physical identifier and separately provide a personal identification number (PIN) or a signature. However, card skimmers are physical hardware that can read information from the physical identifier at a front-end device, often without detection, such that a bad actor may duplicate the physical identifier. Additionally, a small optical sensor may determine the PIN or the signature entered by the user into the front-end device. Therefore, security at front-end devices may be compromised.

When security is compromised, the user (and an entity associated with an account of the user that has been compromised) will consume additional power, processing, and network resources in reporting theft. For example, the user may access a website maintained by the entity in order to report the theft. Furthermore, the entity will generally consume power, processing, and network resources in replacing the physical identifier for the user (and possibly assigning a new PIN to the user). For example, the entity may deactivate the old physical identifier and associate the new physical identifier with the account of the user on a computerized system that issues and tracks physical identifiers (and optionally PINs).

Some implementations described herein provide for using an augmented reality (AR) device to interact with a front-end device. The AR device allows a user to provide a PIN, a signature, or another type of sensitive information without being recorded by a small optical sensor. For example, a bad actor operating the optical sensor will have a significantly harder time determining how the user's hand gestures translate to input as compared with monitoring a physical input device (such as a touchscreen or a keypad) for input. As a result, security at the front-end device is improved because chances of comprising an account of the user are reduced. Furthermore, improved security conserves power, processing, and network resources that the user otherwise would have been consumed in reporting theft. Additionally, improved security conserves power and processing resources that an entity, associated with the account of the user, would have used in issuing a new physical identifier associated with the account of the user and associating the new physical identifier with the account on a computerized system that issues and tracks physical identifiers.

FIGS. 1A-1F are diagrams of an example 100 associated with using AR at a front-end device. As shown in FIGS. 1A-1F, example 100 includes a front-end device, an AR device, and a remote server. These devices are described in more detail in connection with FIGS. 4 and 5.

As shown in FIG. 1A and by reference number 105, the AR device may transmit, and the front-end device may receive, a request to use the front-end device. For example, the request may be included in a broadcast message (e.g., a Bluetooth® advertisement or another type of broadcast message). In some implementations, the request may include an identifier associated with the AR device (e.g., a device name, a user equipment (UE) identity (ID), a medium access control (MAC) address, an Internet protocol (IP) address, and/or another piece of information uniquely identifying the AR device or at least quasi-uniquely identifying the AR device). In one example, a user of the AR device may input a command (e.g., via a touchscreen, a keyboard, a microphone, and/or another input device associated with the AR device) that triggers the AR device to transmit the request to use the front-end device.

In some implementations, the user may input the command in response to an indication that the front-end device is nearby. For example, the front-end device may broadcast, and the AR device may receive, a message indicating that the front-end device is nearby (e.g., a Bluetooth advertisement or another type of broadcast message). The AR device may display, based on the message from the front-end device, a push notification, a notification within an application (or "app"), or another type of notification that the front-end device is nearby. Accordingly, the user may input the command in response to the displayed notification. As a result, the AR device may refrain from connecting to the front-end device with relayed communications, connecting to stingray devices, and connection to other suspicious devices, which improves security.

As shown by reference number 110, the AR device may additionally transmit, and the front-end device may additionally receive, a credential (e.g., at least one credential) associated with the user of the AR device. For example, the credential may include a username (optionally with a password), an account number, biometric information, and/or another piece of information uniquely (or at least quasi-uniquely) associated with the user. In some implementations, the credential may be included in the request described in connection with reference number 105. Alternatively, the AR device may transmit the credential after transmitting the request. For example, the AR device and the front-end device may establish a Bluetooth (or another type of wireless personal area network (PAN)) connection based on the request from the AR device, and the AR device may transmit the credential based on establishing the Bluetooth connection.

In some implementations, as described above, the AR device may have a wireless connection with the front-end device. Alternatively, the AR device may have a wired connection with the front-end device. For example, there may be a docking station or another volume adjacent to, or included in, the front-end device in which the AR device is located, and a cord or another type of wire may connect the AR device to the front-end device. Accordingly, the AR device may connect to the front-end device without the credential and/or broadcast messages. For example, the AR device and the front-end device may use a universal serial bus (USB) protocol and/or another type of wired protocol to communicate.

Figure 1B:
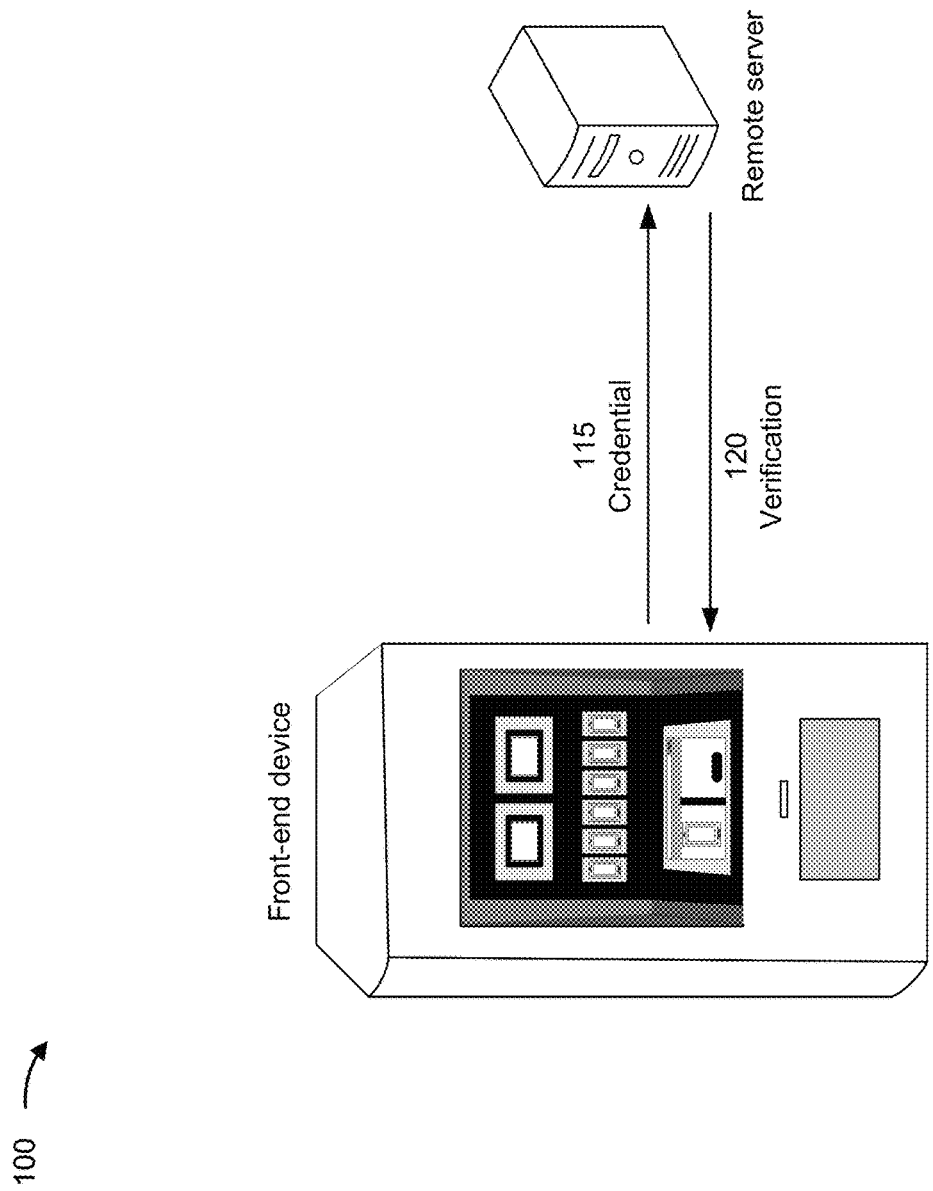

As shown in FIG. 1B and by reference number 115, the front-end device may transmit, and the remote server may receive, the credential associated with the user. For example, the front-end device may transmit a hypertext transfer protocol (HTTP) request and/or perform an application programming interface (API) call with the credential as a parameter. In some implementations, the remote server may be associated with an entity that manages an account associated with the user. For example, the front-end device may use the credential (e.g., an account number) to determine (e.g., using a data structure, such as a look-up table or another type of relational data structure) the remote server to contact. Alternatively, the remote server may be associated with a processing entity for the front-end device, regardless of the entity that manages the account associated with the user.

As shown by reference number 120, the remote server may transmit, and the front-end device may receive, verification of the credential associated with the user. For example, the verification may be included in an HTTP response and/or a data structure returned by an API function. The remote server may verify the credential against a database (whether local to the remote server or at least partially separate, whether logically, virtually, and/or physically) of user credentials. For example, the remote server may verify that an account number associated with the user is valid. In some implementations, the remote server may forward the credential to another device (e.g., a remote server associated with the entity that manages the account associated with the user) for verification. Accordingly, the remote server may forward the verification to the front-end device.

By receiving the credential with the AR device, the front-end device may refrain from receiving the credential using a physical card associated with the user. As a result, security is improved because a physical card skimmer cannot intercept the credential at the front-end device. Improved security conserves power, processing, and network resources that the user otherwise would have consumed in reporting theft. Additionally, improved security conserves power, processing, and network resources that the entity that manages the account associated with the user would have used in issuing a new credential and associating the credential with the account on a computerized system that issues and tracks credentials. Alternatively, the front-end device may receive the credential using a physical card, as described in connection with FIGS. 3A-3B.

Figure 1C:
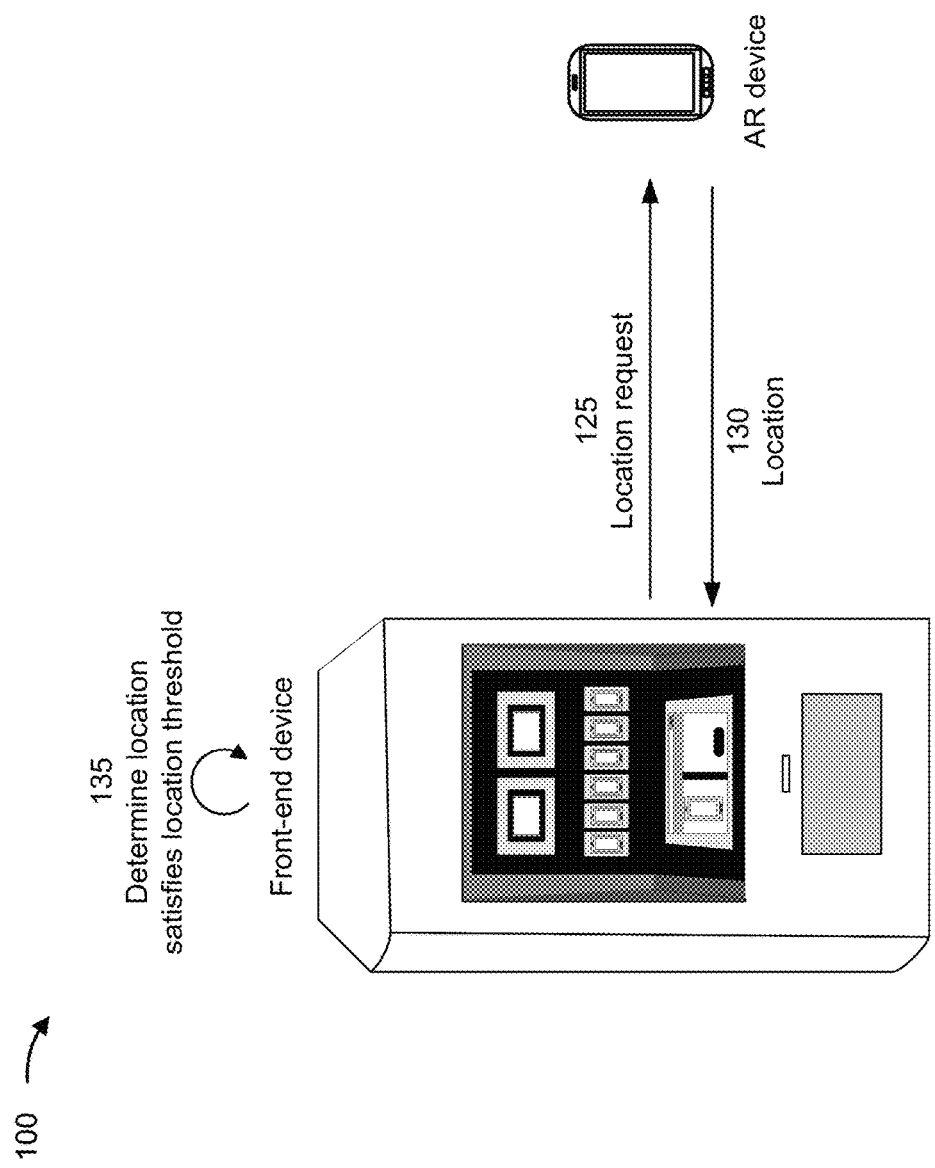

As shown in FIG. 1C and by reference number 125, the front-end device may transmit, and the AR device may receive, a request for a location of the AR device. For example, the request may include a permissions request for an operating system (OS) of the AR device (e.g., an Android® OS or another type of Unix OS, an iOS, or a Windows® OS, among other examples). In some implementations, the front-end device may be pre-authorized to access the location of the AR device (e.g., stored in a permissions data structure managed by the OS), and the AR device may determine to provide the location of the AR device (e.g., determined by global positioning system (GPS) or another type of global navigation satellite system (GNSS)) to the front-end device based on the pre-authorization. Alternatively, the user may provide input approving the request from the front-end device in response to an indication of the request. For example, the AR device may display, based on the request from the front-end device, a push notification, a notification within an "app," or another type of notification that the front-end device is requesting access to the location of the AR device. Accordingly, the user may input a command to provide the location to the front-end device in response to the displayed notification.

As shown by reference number 130, the AR device may transmit, and the front-end device may receive, an indication of the location of the AR device. For example, the AR device may transmit the indication in response to the request from the front-end device. In some implementations, the AR device may use GPS (or another type of GNSS), optionally in common with WiFi® sensing (or another type of radio frequency (RF) triangulation or sensing), to determine the location.

As shown by reference number 135, the front-end device may determine that the location of the AR device satisfies a location threshold. For example, the location threshold may be a geographic zone and may be satisfied when the AR device is located within the geographic zone. In another example, the front-end device may estimate a distance between the front-end device and the AR device and determine that the distance satisfies a distance threshold. As a result, the front-end device may refrain from using relayed communications, communicating with stingray devices, and responding to other types of suspicious requests, which improves security.

Accordingly, the AR device and the front-end device may establish a secure connection. For example, the front-end device may establish the secure connection based on the location of the AR device satisfying the location threshold. The secure connection may be a communication channel between the AR device and the front-end device that is encrypted. For example, the AR device and the front-end device may agree upon a symmetric key to encrypt (and decrypt) messages on the communication channel. In another example, the front-end device may provide one key, of a first asymmetric key pair, for the AR device to encrypt messages on the communication channel, and the AR device may provide one key, of a second asymmetric key pair, for the front-end device to encrypt messages on the communication channel. Therefore, the front-end device may use the other key, of the first asymmetric key pair, to decrypt messages from the AR device on the communication channel, and the AR device may use the other key, of the second asymmetric key pair, to decrypt messages from the front-end device on the communication channel.

Figure 1D:
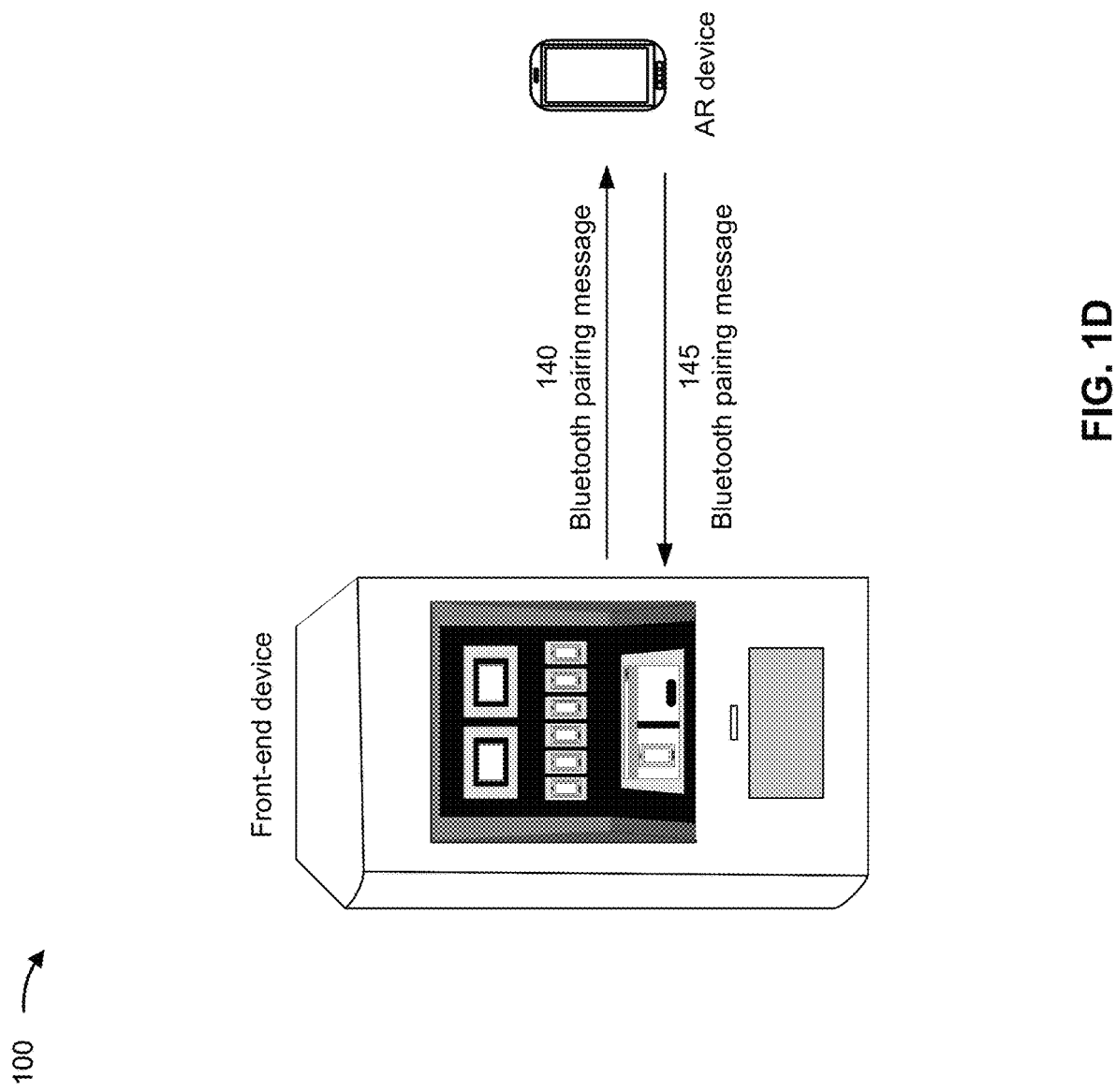

In some implementations, the front-end device and the AR device may establish the secure connection using a wireless PAN. For example, as shown in FIG. 1D and by reference number 140, the front-end device may transmit, and the AR device may receive, a Bluetooth (or another type of wireless PAN) pairing message. In some implementations, the pairing message may be a secure simple pairing (SSP) message or another message using public-key encryption to establish the secure connection with the AR device.

As shown by reference number 145, the AR device may transmit, and the front-end device may receive, a Bluetooth (or another type of personal area network) pairing message. For example, the AR device may transmit a response to the personal area network pairing message from the front-end device. In some implementations, the pairing message may be an SSP message or another message using public-key encryption to establish the secure connection with the front-end device.

Figure 1E:
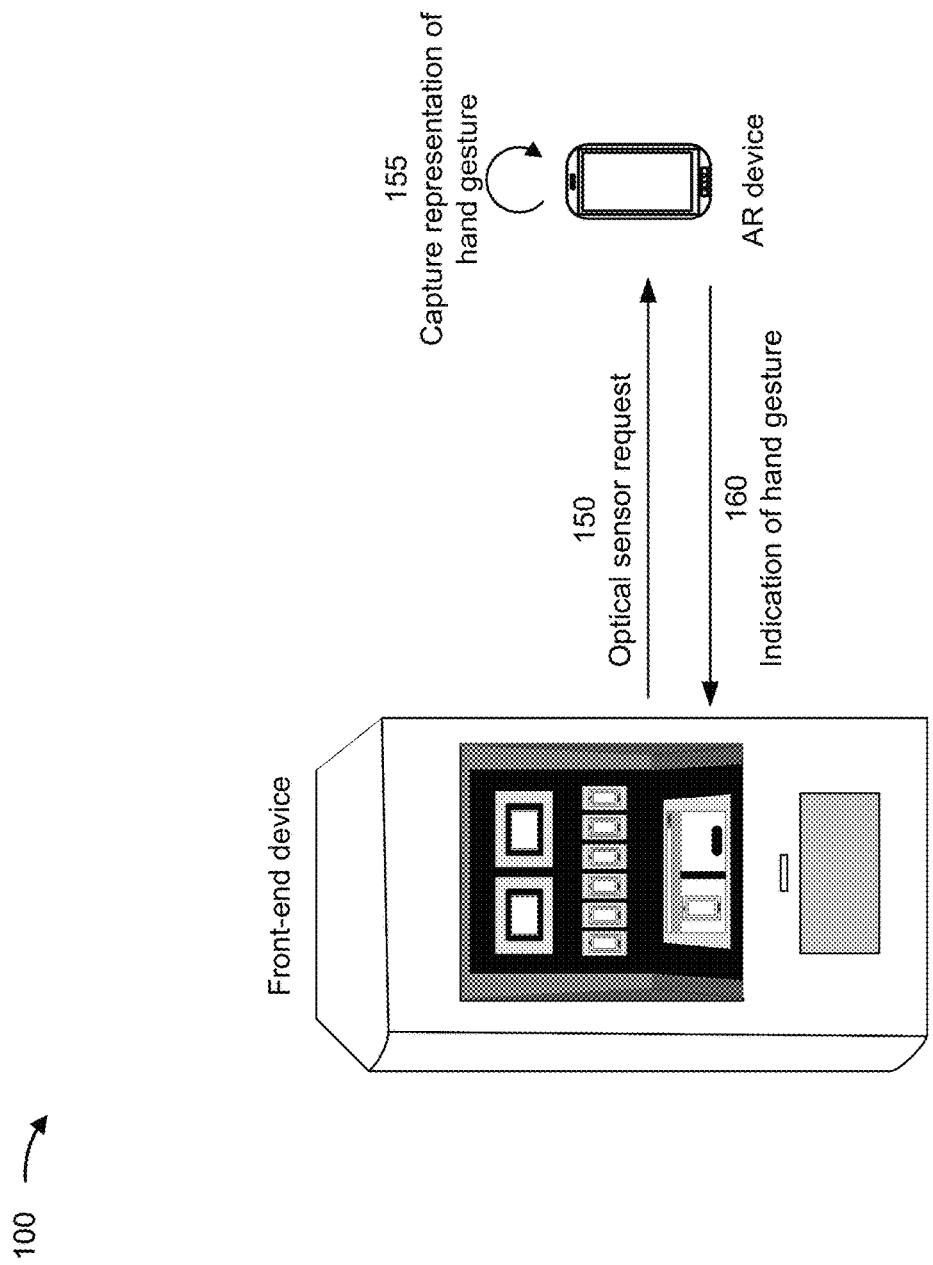

As shown in FIG. 1E and by reference number 150, the front-end device may transmit, and the AR device may receive, a request to access an optical sensor of the AR device. The optical sensor may be integrated into the AR device or may be at least partially separate (e.g., physically, logically, and/or virtually) from, but accessible by, the AR device. The request may include a permissions request for the OS of the AR device. The front-end device may use the secure connection to transmit the request. In some implementations, the front-end device may be pre-authorized to access the optical sensor of the AR device (e.g., stored in a permissions data structure managed by the OS), and the AR device may determine to provide output from the optical sensor (e.g., analog or digital pixel information and/or an image file, among other examples) to the front-end device based on the pre-authorization. Alternatively, the user may provide input approving the request from the front-end device in response to an indication of the request. For example, the AR device may display, based on the request from the front-end device, a push notification, a notification within an "app," or another type of notification that the front-end device is requesting access to the optical sensor of the AR device. Accordingly, the user may input a command to provide output from the optical sensor to the front-end device in response to the displayed notification.

In some implementations, the AR device may transmit, and the front-end device may receive, an authorization to receive the output from the optical sensor. The AR device may use the secure connection to transmit the authorization. The authorization may trigger the front-end device to monitor for (and attempt to decode) a message (e.g., one or more messages) from the AR device that include the output from the optical sensor.

As shown by reference number 155, the AR device may capture (e.g., using the optical sensor) a representation of a hand gesture performed by the user of the AR device. For example, the representation may include an image (e.g., one or more images), whether encoded as an image file or a frame of video, among other examples. In some implementations, the AR device may capture images using the optical sensor at intervals (e.g., every 2 seconds, every 1 second, or every 0.5 seconds, among other examples) or relatively continuously (e.g., at 15 frames per second, at 20 frames per second, or at 40 frames per second, among other examples). Accordingly, the AR device may stream the captured images to the front-end device (e.g., using the secure connection). Alternatively, the AR device may determine which images, out of the captured images, include a hand of the user. For example, the AR device may apply a Viola—Jones object detection framework based on Haar features, a scale-invariant feature transform (SIFT) model, a Single Shot MultiBox Detector (SSD), or a You Only Look Once (YOLO) model, among other examples, to detect the hand of the user in at least one image out of the captured images. Accordingly, the AR device may transmit any images that include the hand of the user to the front-end device. As a result, power, processing resources, and network resources are conserved because the AR device transmits fewer images to the front-end device.

Rather than capture images at intervals (or relatively continuously), the AR device may monitor output from the optical sensor for a trigger. For example, the trigger may include presence of the hand of the user (e.g., as determined by a Viola—Jones object detection framework based on Haar features, a SIFT model, an SSD, or a YOLO model, as described above) or may include a particular gesture performed by the user. In some implementations, the particular gesture may include pointing (e.g., with one finger, two fingers, and so on). Accordingly, the AR device may capture images (e.g., one or more images) after detection of the trigger and transmit the captured images to the front-end device. The AR device may capture images as long as the gesture continues to be detected in the output from the optical sensor or as long as the hand of the user is still present in the output. Alternatively, the AR device may capture a preconfigured quantity of images (or capture images for a preconfigured amount of time) after detecting the trigger. Additionally, or alternatively, the AR device may await input from the user. For example, the user may interact with a touchscreen, a microphone, a keyboard, or another input component in order to trigger the AR device to capture images. For example, the user may press a key or a portion of a touchscreen. Alternatively, the user may speak a phrase (e.g., one preconfigured as a trigger), and the AR device may detect the phrase. In some implementations, to improve security, the AR device may detect the phrase only after determining that a voice signature associated with a recording matches a stored voice signature of the user. After the user provides the input, the AR device may capture images as long as a particular gesture is detected in the output from the optical sensor or as long as the hand of the user is present in the output. Alternatively, the AR device may capture a preconfigured quantity of images (or capture images for a preconfigured amount of time) after receiving the input from the user.

As shown by reference number 160, the AR device may transmit, and the front-end device may receive, an indication of the hand gesture performed by the user of the AR device. The hand gesture may include the user pointing a finger (e.g., one or more fingers) of a hand toward a surface of the front-end device. Accordingly, the user may gesture toward an input key on the front-end device to trigger an action associated with the input key.

As described above, the indication may be the output from the optical sensor. Accordingly, the indication may be an image (e.g., at least one image) representing the hand of the user. Alternatively, the indication may include a vector indicating a set of coordinates and a direction associated with the hand of the user. For example, as described in connection with FIGS. 2D and 2E, the AR device may calculate the vector based on a direction of a finger or another portion of the hand of the user. Furthermore, the AR device may calculate an origin set of coordinates based on a tip of the finger or another portion of the hand of the user and/or a destination set of coordinates based on a projection of the vector toward a surface of the front-end device. The AR device may transmit the indication to the front-end device using the secure connection.

Figure 1F:
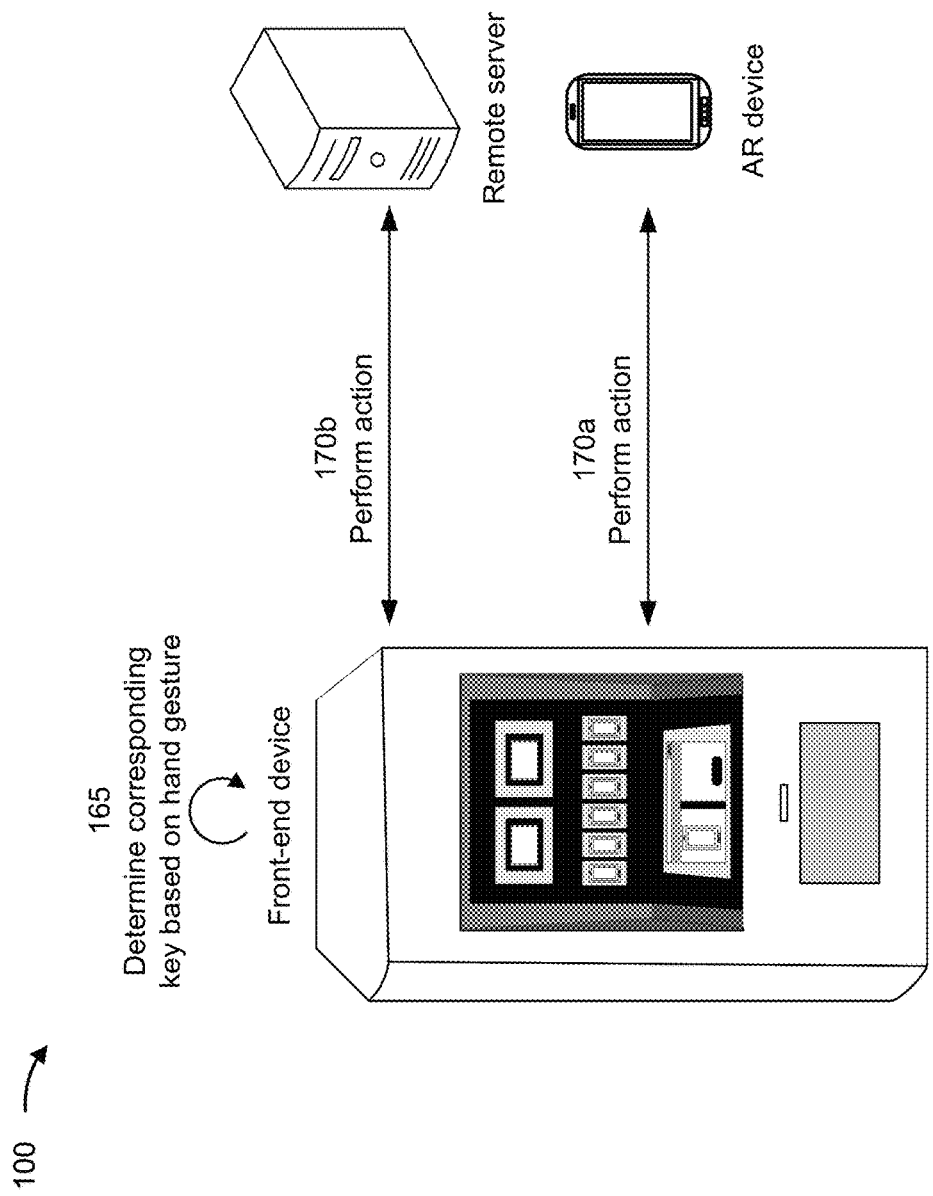

As shown in FIG. 1F and by reference number 165, the front-end device may determine, based on the indication of the hand gesture, a corresponding input key of the front-end device. For example, the indication may include a vector and an origin set of coordinates such that the front-end device may project the vector to determine the corresponding input key on a surface of the front-end device (e.g., as described in connection with FIGS. 2D and 2E). In another example, the indication may include a vector and a destination set of coordinates such that the front-end device may determine the corresponding input key located at the destination set of coordinates and on a surface of the front-end device (e.g., as described in connection with FIGS. 2D and 2E). Alternatively, the indication may include an image representing the hand of the user. Accordingly, the front-end device may calculate a vector based on a direction of a finger or another portion of the hand of the user and project the vector to determine the corresponding input key on a surface of the front-end device (e.g., as described in connection with FIGS. 2D and 2E).

Based on the corresponding input key, the front-end device may perform an action. For example, the corresponding input key may include an alphanumeric key such that a display, a speaker, or another output element of the front-end device reflects an alphanumeric character corresponding to the alphanumeric key. Accordingly, the front-end device may process the alphanumeric input. For example, the front-end device may indicate an amount of money entered by the user based on the user pointing (or otherwise gesturing) toward alphanumeric keys to enter the amount of time. In some implementations, the front-end device may refrain from outputting the alphanumeric character to increase security, such as when the user is entering a PIN based on the user pointing (or otherwise gesturing) toward alphanumeric keys.

Additionally, or alternatively, in some implementations, as shown by reference number 170*a*, the front-end device may perform the action with the AR device. For example, the front-end device may transmit, and the AR device may receive, an indication of the alphanumeric character. Therefore, the AR device may use a display, a speaker, or another output element of the AR device to reflect the alphanumeric character corresponding to the alphanumeric key. For example, the AR device may indicate an amount of money entered by the user based on the user pointing (or otherwise gesturing) toward alphanumeric keys to enter the amount of time. In some implementations, the AR device may refrain from outputting the alphanumeric character to increase security, such as when the user is entering a PIN based on the user pointing (or otherwise gesturing) toward alphanumeric keys.

In another example, as shown by reference number 170*b*, the front-end device may perform the action with the remote server. For example, the corresponding input key may include an "Enter" key such that the front-end device may verify a PIN (or another alphanumeric entry) with the remote server. The front-end device may verify the PIN similarly as described herein in connection with verifying the credential.

The action may instead include a transaction associated with the account of the user. For example, the corresponding input key may be associated with a withdrawal, a deposit, or another type of transaction. In some implementations, the front-end device may contact the remote server to perform the transaction. For example, the remote server may update a data record (whether local to the remote server or at least partially separate, whether logically, virtually, and/or physically) associated with the account. In some implementations, the remote server may forward a command from the front-end device to another device (e.g., a remote server associated with the entity that manages the account associated with the user) for processing. Accordingly, the remote server may forward a confirmation that the transaction is complete to the front-end device.

The operations described in connection with FIGS. 1E and 1F may be iterative. For example, the AR device may capture (e.g., using the optical sensor) a representation of an additional hand gesture performed by the user of the AR device. Accordingly, the AR device may transmit, and the front-end device may receive, an additional indication based on the representation of the additional hand gesture. The front-end device may determine, based on the additional indication, an additional corresponding input key of the front-end device and may perform an additional action based on the additional corresponding input key. Accordingly, the user may input multiple characters (and/or numbers) for an alphanumeric code using the iterative process. Additionally, or alternatively, the user may use the AR device to interact with a sequence of corresponding input keys that triggers a transaction associated with the account of the user, as described above.

In another example, the front-end device may process multiple hand gestures before performing an action. For example, the front-end device may anticipate four entries for a PIN, so the front-end device may wait until four hand gestures are processed to proceed. Additionally, or alternatively, the front-end device may wait for an amount of time before processing the hand gestures. For example, the front-end device may prompt the user to enter an amount of money or a signature, and the front-end device may start a timer after the prompt and wait until expiry of the timer to process all hand gestures received during the amount of time. In some implementations, the front-end device may proceed before expiry of the timer in response to particular input from the user (e.g., pointing at an "Enter" or a "Yes" or a "Confirm" button or waving a hand to confirm that the user is done, among other examples).

By using techniques as described in connection with FIGS. 1A-1F, the user interacts with the front-end device through the AR device. Accordingly, a bad actor operating a hidden optical sensor will have a significantly harder time determining how the user's hand gestures translate to input as compared with monitoring the input keys of the front-end device. As a result, security at the front-end device is improved because chances of compromising an account of the user are reduced. Furthermore, improved security conserves power, processing, and network resources that the user otherwise would have consumed in reporting theft. Additionally, improved security conserves power, processing, and network resources that an entity, associated with the account of the user, would have used in issuing a new credential associated with the account of the user and associating the new credential with the account on a computerized system that issues and tracks credentials.

As indicated above, FIGS. 1A-1F are provided as an example. Other examples may differ from what is described with regard to FIGS. 1A-1F.

FIGS. 2A-2E are diagrams of an example 200 associated with AR interfaces. In FIGS. 2A-2E, example 200 may be implemented on an AR device used at a front-end device. These devices are described in more detail in connection with FIGS. 4 and 5.

Figure 2A:
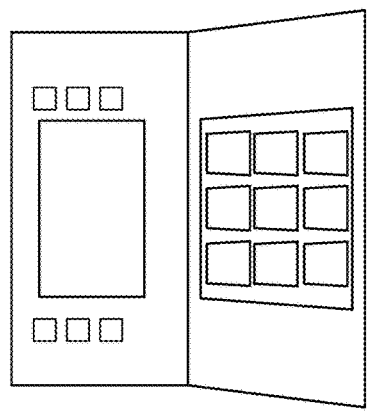

As shown in FIG. 2A, the front-end device may include an ATM that includes a plurality of input keys (e.g., on one or more surfaces of the ATM). Alternatively, the front-end device may include a PoS terminal that includes a plurality of input keys (e.g., on one or more surfaces of the PoS terminal).

Figure 2B:
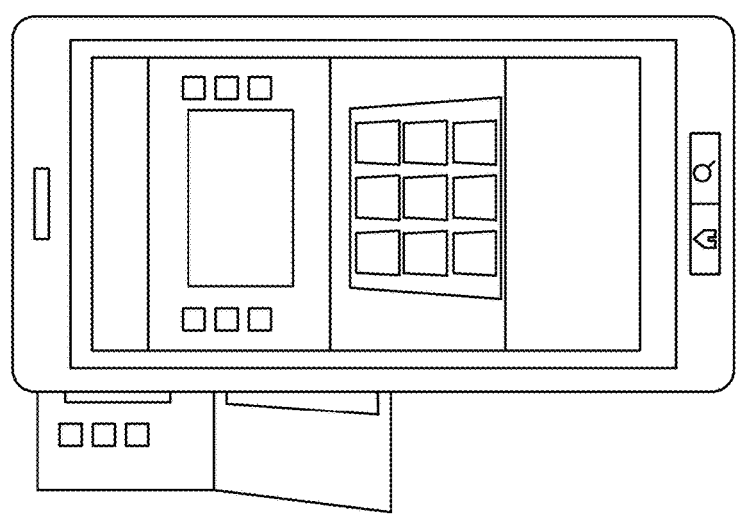

As shown in FIGS. 2B-2E, the AR device may include a smart phone. Alternatively, the AR device may include a set of AR glasses or another type of device that passes images of the front-end device to a display with an augmentation (e.g., one or more augmentations), as described herein. Accordingly, as shown in FIG. 2B, an optical sensor of the AR device may capture an image (or images) of the front-end device and transmit the captured image to the display of the AR device.

Figure 2C:
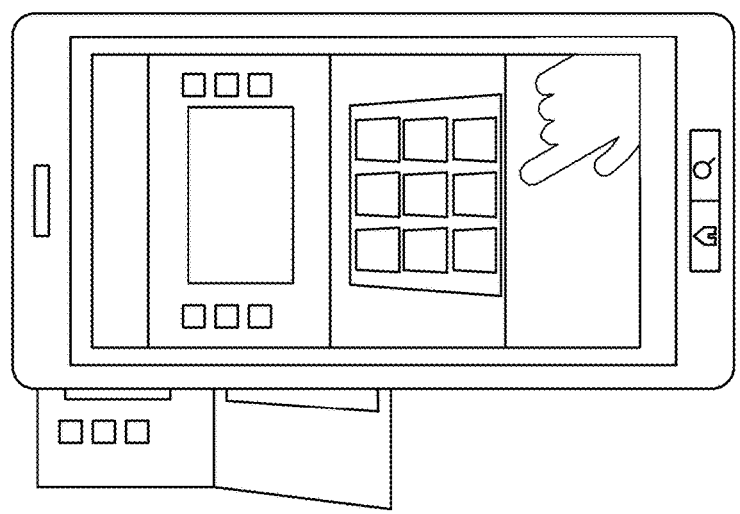

As shown in FIG. 2C, a user of the AR device may move a hand of the user such that the hand is represented in the image (that is passed from the optical sensor to the display). The AR device may detect the presence of the hand (e.g., as described in connection with FIG. 1E) and calculate an origin set of coordinates associated with the hand. For example, the origin set of coordinates may be an approximate center of the hand. In another example, the hand may be pointing with a finger (or multiple fingers) such that the origin set of coordinates is a tip of the finger (or an approximately average between the tips of multiple fingers).

As shown in FIG. 2D, the AR device may calculate a vector based on the origin set of coordinates and a direction associated with the hand. For example, the direction may be based on a direction that a finger (or multiple fingers) of the hand is pointing. In another example, the direction may be based on an extrapolation from an approximate center of a hand toward a location of a tip of a finger (or an averaged location from multiple tips of multiple fingers) or a location of a knuckle (or an averaged location from multiple knuckles), among other examples. Accordingly, the AR device may display an augmentation over the passed-through image of the front-end device and the hand, and the augmentation may be a visual representation of the calculated vector.

By passing through images of the front-end device with the augmentation, the AR device conserves power, processing, and network resources as compared with downloading and displaying virtual interfaces associated with the front-end device. Additionally, power, processing, and network resources are conserved that otherwise would have been consumed in building and deploying the virtual interfaces associated with the front-end device. Network congestion is also reduced because the virtual interfaces are not transmitted to the AR device, which conserves power, processing, and network resources at nearby devices by reducing chances of collisions and retransmissions.

In some implementations, the AR device may additionally calculate a destination set of coordinates associated with the hand. For example, the destination set of coordinates may be a projection of the vector until the vector intersects with a surface of the front-end device. Accordingly, as shown in FIG. 2D, the AR device may estimate a corresponding input key of the front-end device, on the surface, that corresponds to a hand gesture performed by the user.

Thus, the AR device may display an image (an augmented image) that shows (or otherwise represents) at least one surface of the front-end device, a hand of the user, and at least one overlay (e.g., a projection of the hand onto the at least one surface, as shown in FIG. 2D).

Figure 2E:
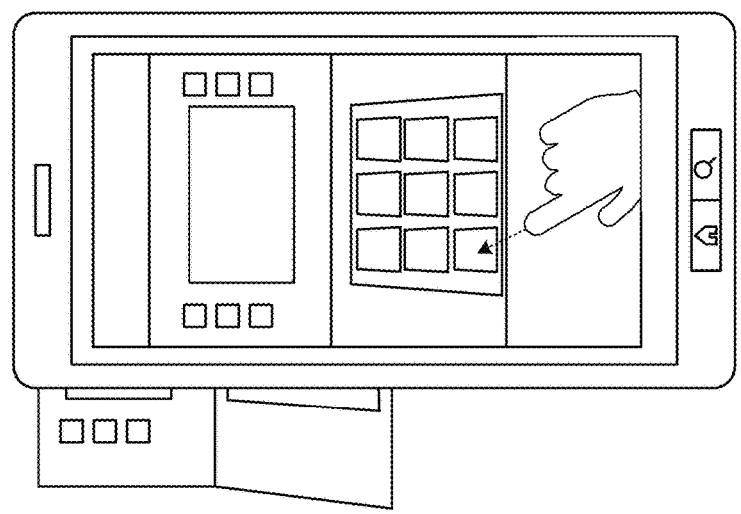

As shown in FIG. 2E, the AR device may update the augmented image as the hand of the user moves. For example, in FIG. 2E, the user has moved the hand (or at least a finger of the hand that is pointing), and the AR device may re-calculated the vector. Accordingly, the overlay may show the re-calculated vector. Additionally, the AR device may re-calculate a destination set of coordinates associated with the hand (and on a surface of the front-end device) such that the overlay shows a new corresponding input key on the front-end device based on the destination set of coordinates. Therefore, the user may select input keys of the front-end device with which to interact by using the augmented images of the front-end device displayed on the AR device but without touching the input keys of the front-end device.

As indicated above, FIGS. 2A-2E are provided as an example. Other examples may differ from what is described with regard to FIGS. 2A-2E.

Figure 3A:
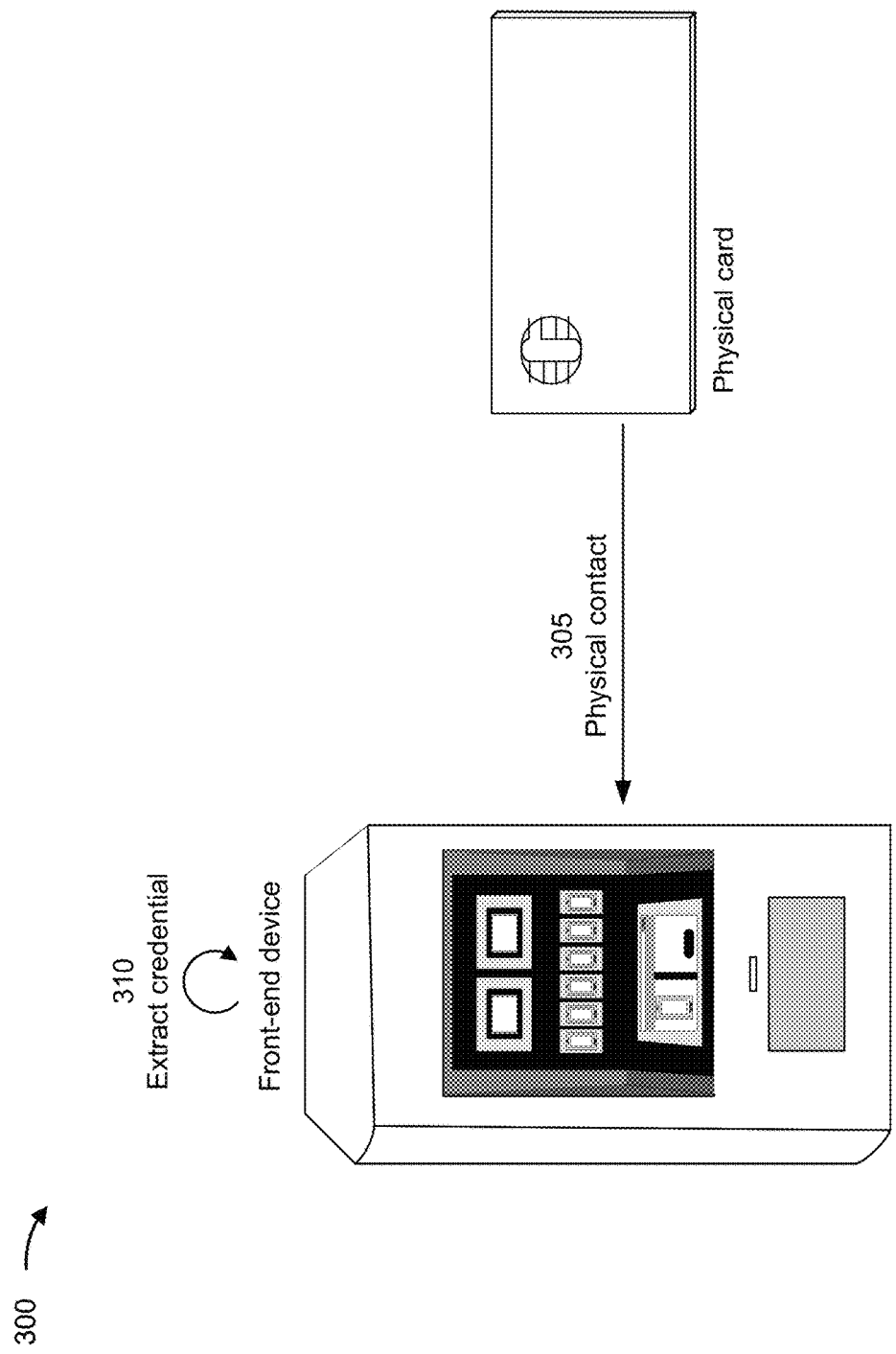
FIGS. 3A-3B are diagrams of an example implementation relating to using AR at a front-end device, in accordance with some embodiments of the present disclosure.
Figure 3B:
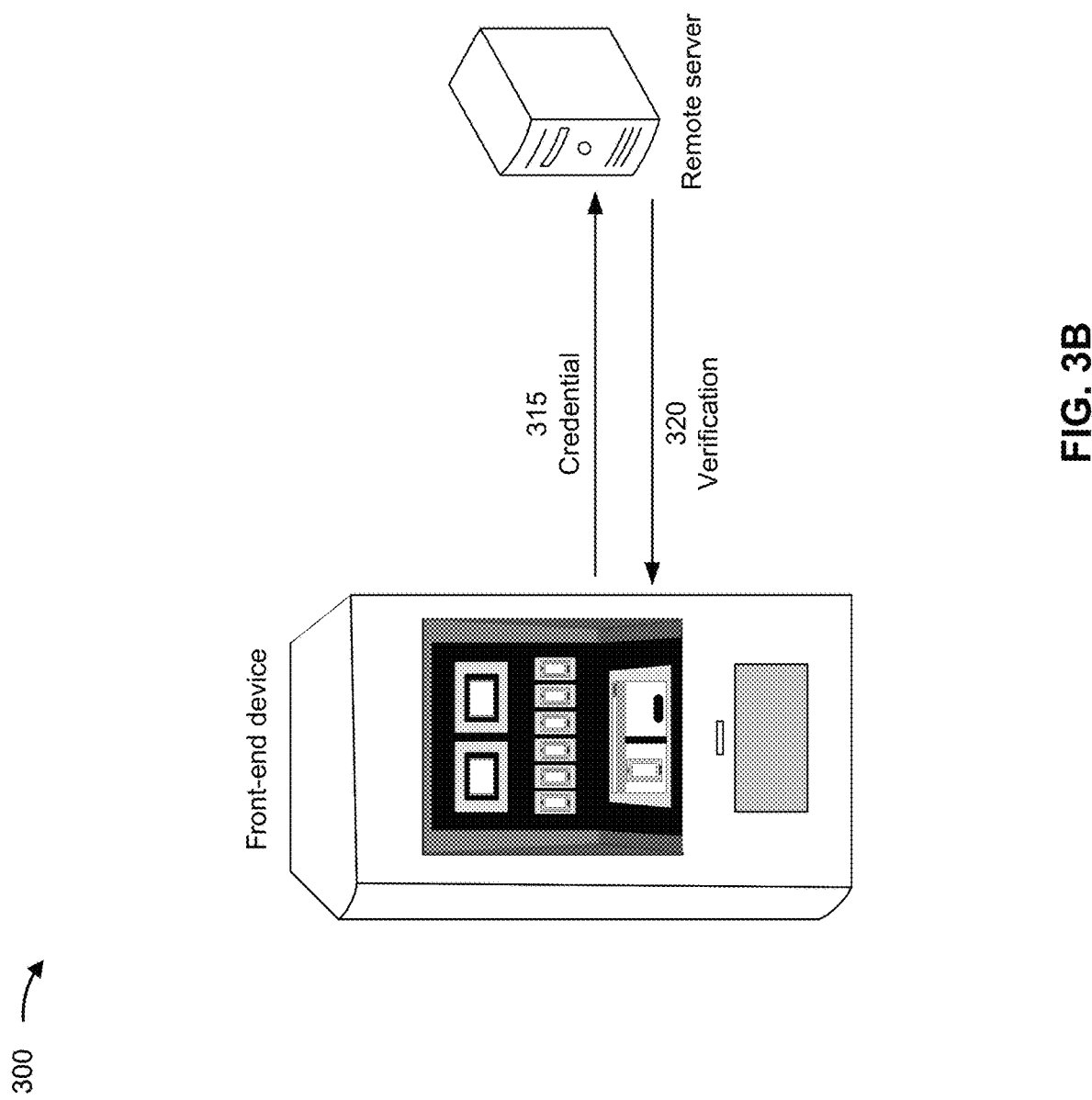

FIGS. 3A-3B are diagrams of an example 300 associated with using AR at a front-end device. As shown in FIGS. 3A-3B, example 300 includes a physical card, a front-end device, and a remote server. These devices are described in more detail in connection with FIGS. 4 and 5.

As shown in FIG. 3A and by reference number 305, the physical card may contact the front-end device. In some implementations, physical properties of the physical card may be consistent with International Organization for Standardization (ISO) and International Electrotechnical Commission (IEC) standard 7810 (ISO/IEC 7810), ISO/IEC 14443-1, and/or ISO/IEC 7816-1. For example, the physical card may have a width in a range from 15 millimeters (mm) (approximately 0.591 inches (in.)) to 88 mm (approximately 3.465 in.). Additionally, the physical card may have a length in a range from 25 mm (approximately 0.984 in.) to 125 mm (approximately 4.921 in.). The physical card may have a thickness in a range from 0.68 mm (approximately 0.027 in.) to 0.84 mm (approximately 0.033 in.). In some implementations, the physical card may contact the front-end device using a plurality of pins that are configured to physically and electrically contact the front-end device (e.g., according to ISO/IEC 7816-2). Alternatively, the physical card may include an antenna configured to wirelessly communicate with the front-end device (e.g., according to ISO/IEC 14443-2 or ISO/IEC 18000, among other examples).

As shown by reference number 310, the front-end device may extract, from the physical card, a credential (e.g., at least one credential) associated with a user of the physical card. For example, the credential may include a username (optionally with a password), an account number, biometric information, and/or another piece of information uniquely (or at least quasi-uniquely) associated with the user. In some implementations, the front-end device may read a magnetic strip or another component of the physical card to determine the credential. Alternatively, the front-end device may communicate with the physical card (e.g., according to a wired process, such as that described in ISO/IEC 7816-2, or according to a wireless process, such as that described in ISO/IEC 14443-2 or ISO/IEC 18000) such that the physical card transmits the credential to the front-end device.

As shown in FIG. 3B and by reference number 315, the front-end device may transmit, and the remote server may receive, the credential. For example, the front-end device may transmit an HTTP request and/or perform an API call with the credential as a parameter. In some implementations, the remote server may be associated with an entity that manages an account associated with the user. For example, the front-end device may use the credential (e.g., an account number) to determine (e.g., using a data structure, such as a look-up table or another type of relational data structure) the remote server to contact. Alternatively, the remote server may be associated with a processing entity for the front-end device, regardless of the entity that manages the account associated with the user.

As shown by reference number 320, the remote server may transmit, and the front-end device may receive, verification of the credential associated with the user. For example, the verification may be included in an HTTP response and/or a data structure returned by an API function. The remote server may verify the credential against a database (whether local to the remote server or at least partially separate, whether logically, virtually, and/or physically) of user credentials. For example, the remote server may verify that an account number associated with the user is valid. In some implementations, the remote server may forward the credential to another device (e.g., a remote server associated with the entity that manages the account associated with the user) for verification. Accordingly, the remote server may forward the verification to the front-end device.

Thereafter, the front-end device may proceed with operations as described in connection with FIGS. 1C-1F based on receiving the physical card (associated with the user) and verifying the physical card (e.g., via the remote server). By using techniques as described in connection with FIGS. 3A-3B to verify a credential, power, processing, and network resources are conserved at an AR device (e.g., as described in connection with FIGS. 1A-1B) because the AR device does not consume power, processing, and network resources in transmitting the credential to the front-end device. Additionally, wireless congestion near the front-end device is reduced because the AR device is not the credential to the front-end device, which further conserves power, processing, and network resources at nearby devices by reducing chances of collisions and retransmissions.

As indicated above, FIGS. 3A-3B are provided as an example. Other examples may differ from what is described with regard to FIGS. 3A-3B.

Figure 4:
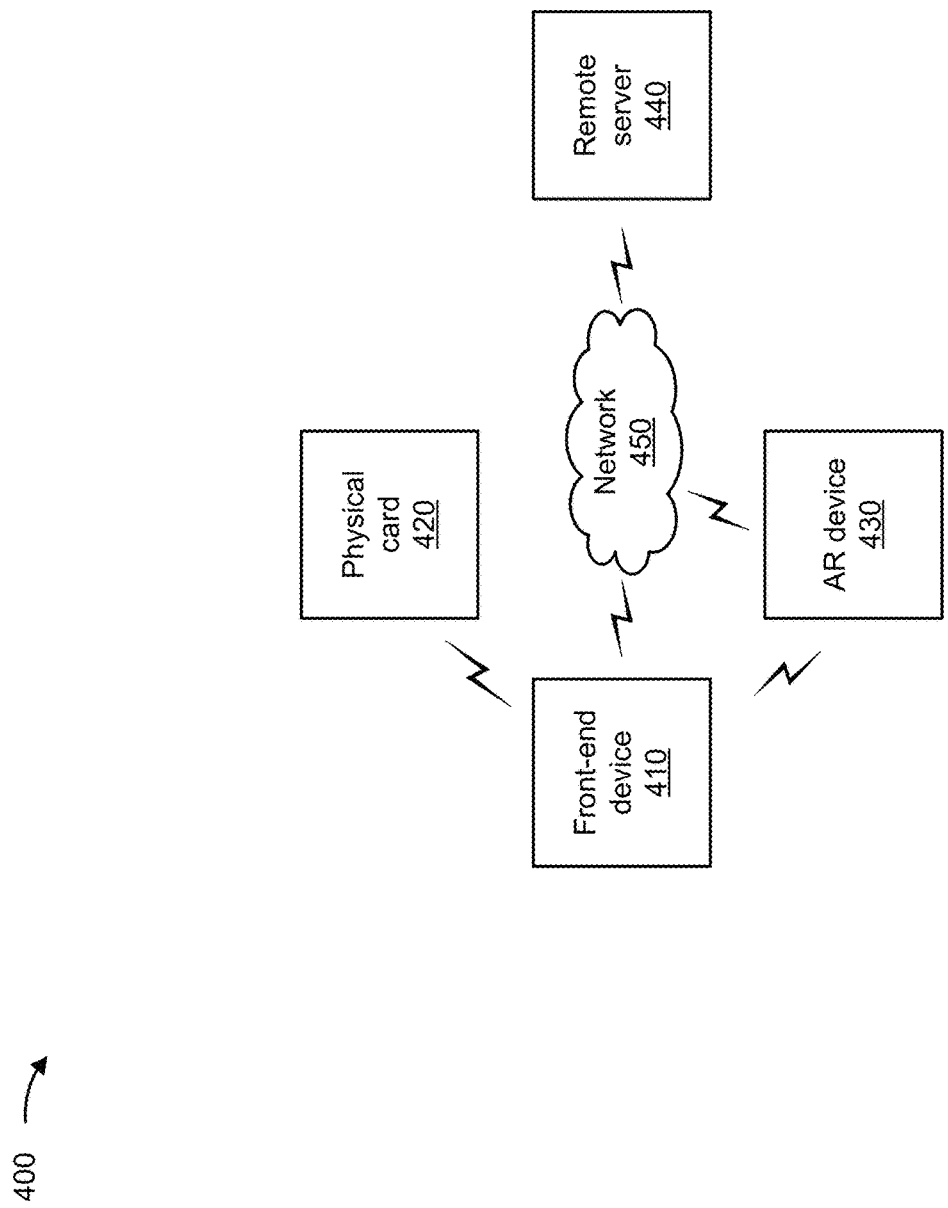
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a front-end device 410, a card 420, an AR device 430, a remote server 440, and/or a network 450. Devices of environment 400 may interconnect via wired connections and/or wireless connections.

The front-end device 410 may include one or more devices capable of facilitating an electronic transaction associated with the card 420. For example, the front-end device 410 may include a PoS terminal, a payment terminal (e.g., a credit card terminal, a contactless payment terminal, a mobile credit card reader, or a chip reader), and/or an ATM. In some implementations, the front-end device 410 may include an access control terminal (e.g., used to control physical access to a secure area), such as an access control panel used to control an access-controlled entry (e.g., a turnstile, a door, a gate, or another physical barrier). The front-end device 410 may include one or more input components and/or one or more output components to facilitate obtaining data (e.g., account information) from the card 420 and/or to facilitate interaction with and/or authorization from an owner or accountholder of the card 420. Example input components of the front-end device 410 include a number keypad, a touchscreen, a magnetic stripe reader, a chip reader, and/or an RF signal reader (e.g., a Bluetooth reader or a near-field communication (NFC) reader). Example output devices of front-end device 410 include a display and/or a speaker.

The card 420 may include one or more devices capable of being used for an electronic transaction. In some implementations, the card 420 may include a transaction card (or another physical medium with integrated circuitry) capable of storing and communicating account information, such as a credit card, a debit card, a gift card, an ATM card, a transit card, a fare card, and/or an access card.

The card 420 may store account information associated with the card 420, which may be used in connection with an electronic transaction facilitated by the front-end device 410. The account information may include, for example, an account identifier that identifies an account (e.g., a bank account or a credit account) associated with the card 420 (e.g., an account number, a card number, a bank routing number, and/or a bank identifier), a cardholder identifier (e.g., identifying a name of a person, business, or entity associated with the account or the card 420), expiration information (e.g., identifying an expiration month and/or an expiration year associated with the card 420), and/or a credential (e.g., a payment token). In some implementations, the card 420 may store the account information in tamper-resistant memory of the card 420, such as in a secure element. As part of performing an electronic transaction, the card 420 may transmit the account information to the front-end device 410 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the card 420 and the front-end device 410 may communicate with one another by coming into contact with one another (e.g., using a magnetic stripe or an EMV chip) or via contactless communication (e.g., using NFC).

The AR device 430 may include one or more devices capable of being used for an electronic transaction, as described above in connection with the card 420. Additionally, the AR device may include an output component capable of displaying an augmented user interface (UI), as described in connection with FIGS. 2A-2E. The AR device 430 may include a communication device and/or a computing device. For example, the AR device 430 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the AR device 430 may be capable of receiving, generating, storing, processing, and/or providing a credential associated with a user, as described elsewhere herein.

The remote server 440 may include one or more devices capable of processing, authorizing, and/or facilitating a transaction. For example, the remote server 440 may include one or more servers and/or computing hardware (e.g., in a cloud computing environment or separate from a cloud computing environment) configured to receive and/or store information associated with processing an electronic transaction. The remote server 440 may process a transaction, such as to approve (e.g., permit, authorize, or the like) or decline (e.g., reject, deny, or the like) the transaction and/or to complete the transaction if the transaction is approved. The remote server 440 may process the transaction based on information received from the front-end device 410, such as transaction data (e.g., information that identifies a transaction amount, a merchant, a time of a transaction, a location of the transaction, or the like), account information communicated to the front-end device 410 by the card 420, and/or information stored by the remote server 440 (e.g., for fraud detection).

The remote server 440 may be associated with a financial institution (e.g., a bank, a lender, a credit card company, or a credit union) and/or may be associated with a transaction card association that authorizes a transaction and/or facilitates a transfer of funds. For example, the remote server 440 may be associated with an issuing bank associated with the card 420, an acquiring bank (or merchant bank) associated with the merchant and/or the front-end device 410, and/or a transaction card association (e.g., VISA® or MASTERCARD®) associated with the card 420. Based on receiving information associated with the card 420 from the front-end device 410, one or more devices of the remote server 440 may communicate to authorize a transaction and/or to transfer funds from an account associated with the card 420 to an account of an entity (e.g., a merchant) associated with the front-end device 410.

The network 450 may include one or more wired and/or wireless networks. For example, the network 450 may include a cellular network, a public land mobile network, a local area network, a wide area network, a metropolitan area network, a telephone network, a private network, the Internet, and/or a combination of these or other types of networks. The network 450 enables communication among the devices of environment 400. In some implementations, the front-end device 410 may communicate with the card 420 using a first network (e.g., a contactless network or by coming into contact with the card 420) and may communicate with the remote server 440 using a second network.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
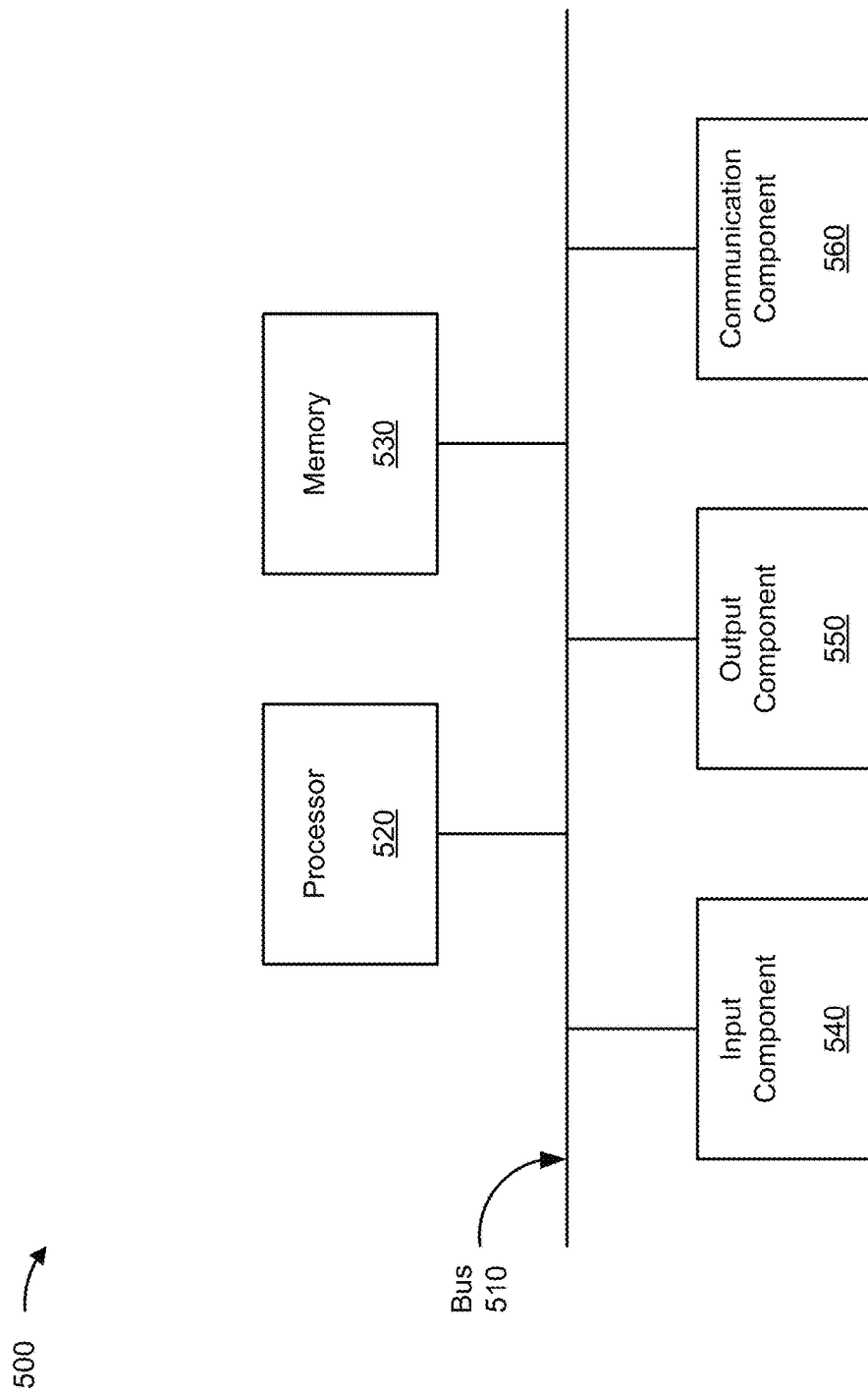
FIG. 5 is a diagram of example components of one or more devices of FIG. 4, in accordance with some embodiments of the present disclosure.

FIG. 5 is a diagram of example components of a device 500 associated with using AR at a front-end device. The device 500 may correspond to a physical card, a front-end device, an AR device, or a remote server. In some implementations, the physical card, the front-end device, the AR device, and/or the remote server may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
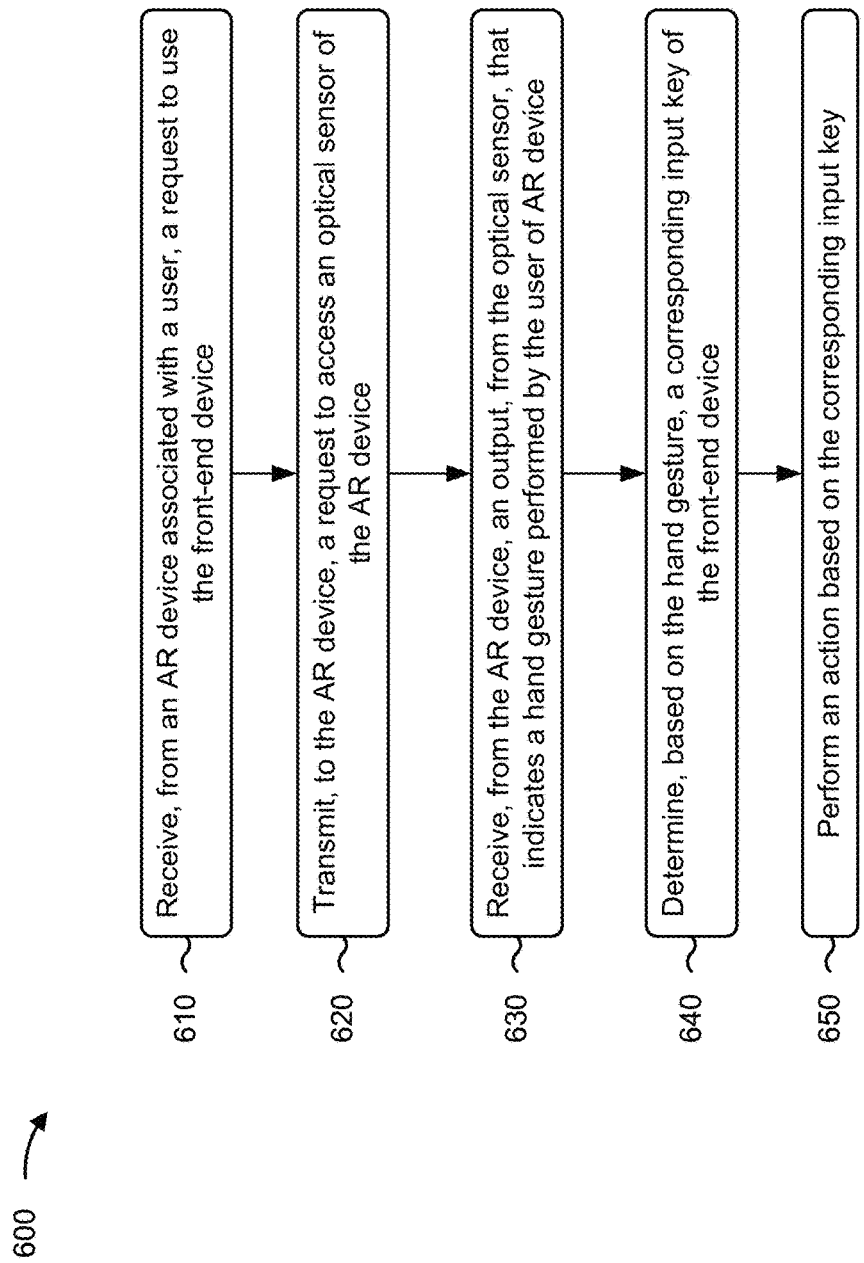
FIGS. 6-7 are flowcharts of example processes relating to using AR at a front-end device, in accordance with some embodiments of the present disclosure.

FIG. 6 is a flowchart of an example process 600 associated with using AR at a front-end device. In some implementations, one or more process blocks of FIG. 6 may be performed by the front-end device 410. In some implementations, one or more process blocks of FIG. 6 may be performed by another device or a group of devices separate from or including the front-end device 410, such as the AR device 430 and/or the remote server 440. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving, from an AR device associated with a user, a request to use the front-end device (block 610). For example, the front-end device 410 (e.g., using processor 520, memory 530, input component 540, and/or communication component 560) may receive, from an AR device associated with a user, a request to use the front-end device, as described above in connection with reference number 105 of FIG. 1A. As an example, the front-end device may broadcast, and the AR device may receive, a message indicating that the front-end device is nearby (e.g., a Bluetooth advertisement or another type of broadcast message). Accordingly, the AR device may transmit the request in response to the message.

As further shown in FIG. 6, process 600 may include transmitting, to the AR device, a request to access an optical sensor of the AR device (block 620). For example, the front-end device 410 (e.g., using processor 520, memory 530, and/or communication component 560) may transmit, to the AR device, a request to access an optical sensor of the AR device, as described above in connection with reference number 150 of FIG. 1E. As an example, the request may include a permissions request for an OS of the AR device.

As further shown in FIG. 6, process 600 may include receiving, from the AR device, an output, from the optical sensor, that indicates a hand gesture performed by the user of the AR device (block 630). For example, the front-end device 410 (e.g., using processor 520, memory 530, input component 540, and/or communication component 560) may receive, from the AR device, an output, from the optical sensor, that indicates a hand gesture performed by the user of the AR device, as described above in connection with reference number 160 of FIG. 1E. As an example, the hand gesture may include the user pointing a finger (e.g., one or more fingers) of a hand toward a surface of the front-end device. The indication may be an image (e.g., at least one image) representing the hand of the user. Alternatively, the indication may include a vector indicating a set of coordinates and a direction associated with the hand of the user.

As further shown in FIG. 6, process 600 may include determining, based on the hand gesture, a corresponding input key of the front-end device (block 640). For example, the front-end device 410 (e.g., using processor 520 and/or memory 530) may determine, based on the hand gesture, a corresponding input key of the front-end device, as described above in connection with reference number 165 of FIG. 1F. As an example, the indication may include a vector and an origin set of coordinates such that the front-end device may project the vector to determine the corresponding input key on a surface of the front-end device (e.g., as described in connection with FIGS. 2D and 2E). In another example, the indication may include a vector and a destination set of coordinates such that the front-end device may determine the corresponding input key located at the destination set of coordinates and on a surface of the front-end device (e.g., as described in connection with FIGS. 2D and 2E). Alternatively, the indication may include an image representing the hand of the user. Accordingly, the front-end device may calculate a vector based on a direction of a finger or another portion of the hand of the user and project the vector to determine the corresponding input key on a surface of the front-end device (e.g., as described in connection with FIGS. 2D and 2E).

As further shown in FIG. 6, process 600 may include performing an action based on the corresponding input key (block 650). For example, the front-end device 410 (e.g., using processor 520 and/or memory 530) may perform an action based on the corresponding input key, as described above in connection with reference numbers 170a and 170b of FIG. 1F. As an example, the front-end device may process alphanumeric input. Additionally, or alternatively, in some implementations, the front-end device may perform the action with the AR device. In another example, the front-end device may perform the action with the remote server.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1F and/or 3A-3B. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

Figure 7:
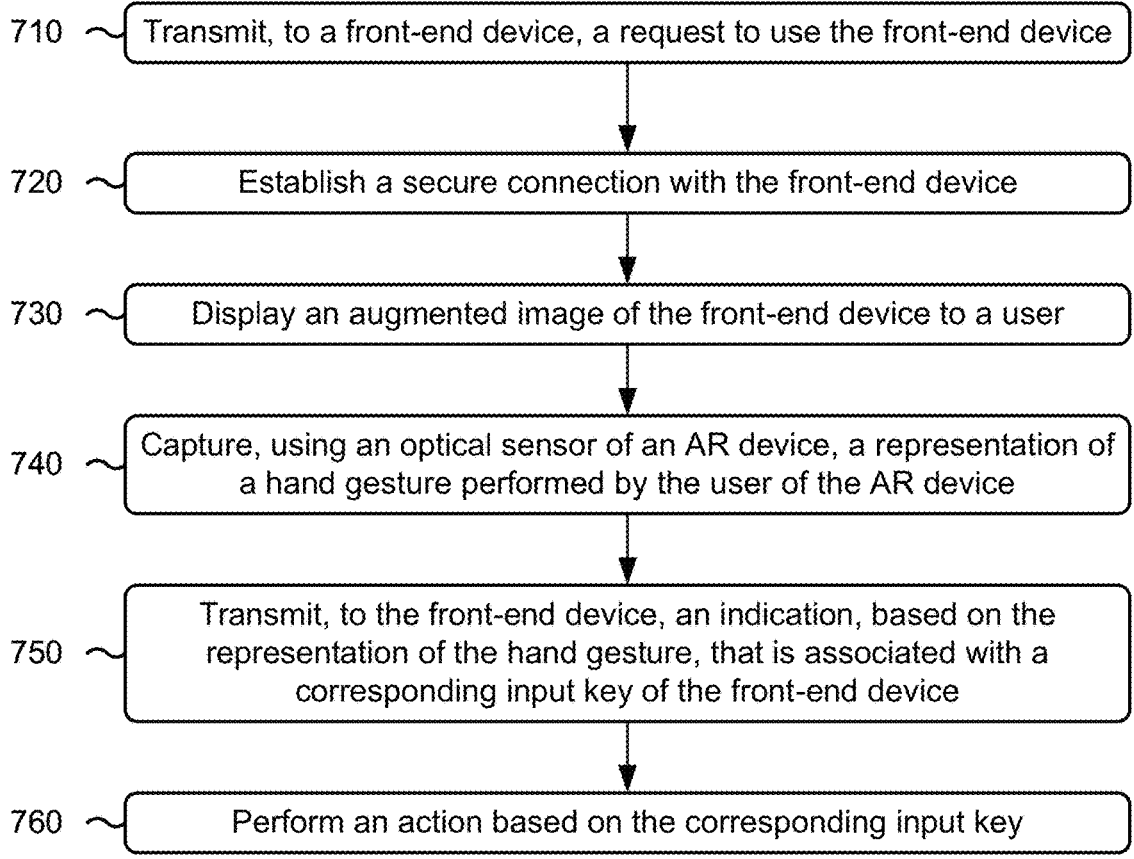

FIG. 7 is a flowchart of an example process 700 associated with using AR at a front-end device. In some implementations, one or more process blocks of FIG. 7 may be performed by the AR device 430. In some implementations, one or more process blocks of FIG. 7 may be performed by another device or a group of devices separate from or including the AR device 430, such as the front-end device 410 and/or the remote server 440. Additionally, or alternatively, one or more process blocks of FIG. 7 may be performed by one or more components of the device 500, such as processor 520, memory 530, input component 540, output component 550, and/or communication component 560.

As shown in FIG. 7, process 700 may include transmitting, to the front-end device, a request to use the front-end device (block 710). For example, the AR device 430 (e.g., using processor 520, memory 530, and/or communication component 560) may transmit, to the front-end device, a request to use the front-end device, as described above in connection with reference number 105 of FIG. 1A. As an example, the front-end device may broadcast, and the AR device may receive, a message indicating that the front-end device is nearby (e.g., a Bluetooth advertisement or another type of broadcast message). Accordingly, the AR device may transmit the request in response to the message.

As further shown in FIG. 7, process 700 may include establishing a secure connection with the front-end device (block 720). For example, the AR device 430 (e.g., using processor 520 and/or memory 530) may establish a secure connection with the front-end device, as described above in connection with reference numbers 140 and 145 of FIG. 1D. As an example, the front-end device and the AR device may establish the secure connection using a wireless PAN. For example, the AR device and the front-end device may exchange SSP messages or another set of messages using public-key encryption to establish the secure connection.

As further shown in FIG. 7, process 700 may include displaying an augmented image of the front-end device to a user (block 730). For example, the AR device 430 (e.g., using processor 520, memory 530, and/or output component 550) may display an augmented image of the front-end device to a user, as described above in connection with FIGS. 2D and 2E. As an example, the augmented images may show (or otherwise represent) at least one surface of the front-end device, a hand of the user, and at least one overlay (e.g., a projection of the hand onto the at least one surface, as shown in FIG. 2D).

As further shown in FIG. 7, process 700 may include capturing, using an optical sensor of the AR device, a representation of a hand gesture performed by the user of the AR device (block 740). For example, the AR device 430 (e.g., using processor 520 and/or memory 530) may capture, using an optical sensor of the AR device, a representation of a hand gesture performed by the user of the AR device, as described above in connection with reference number 155 of FIG. 1E. As an example, the AR device may capture images using the optical sensor at intervals or relatively continuously. Alternatively, the AR device may determine which images, out of the captured images, include a hand of the user. Alternatively, the AR device may monitor output from the optical sensor for a trigger.

As further shown in FIG. 7, process 700 may include transmitting, to the front-end device, an indication, based on the representation of the hand gesture, that is associated with a corresponding input key of the front-end device (block 750). For example, the AR device 430 (e.g., using processor 520, memory 530, and/or communication component 560) may transmit, to the front-end device, an indication, based on the representation of the hand gesture, that is associated with a corresponding input key of the front-end device, as described above in connection with reference number 160 of FIG. 1E. As an example, the hand gesture may include the user pointing a finger (e.g., one or more fingers) of a hand toward a surface of the front-end device. The indication may be an image (e.g., at least one image) representing the hand of the user. Alternatively, the indication may include a vector indicating a set of coordinates and a direction associated with the hand of the user.

As further shown in FIG. 7, process 700 may include performing an action based on the corresponding input key (block 760). For example, the AR device 430 (e.g., using processor 520 and/or memory 530) may perform an action based on the corresponding input key, as described above in connection with reference numbers 170a and 170b of FIG. 1F. As an example, the front-end device may process alphanumeric input. Additionally, or alternatively, in some implementations, the front-end device may perform the action with the AR device. In another example, the front-end device may perform the action with the remote server.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1F and/or 2A-2E. Moreover, while the process 700 has been described in relation to the devices and components of the preceding figures, the process 700 can be performed using alternative, additional, or fewer devices and/or components. Thus, the process 700 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for configuring and using augmented reality at a front-end device, the system comprising:
   one or more memories; and
   one or more processors, communicatively coupled to the one or more memories, configured to:
      identify, at the front-end device, an augmented reality (AR) device associated with a user that is a distance from the front-end device that satisfies a distance threshold;
      establish a secure connection with the AR device using a wireless personal area network;
      transmit, over the secure connection and to the AR device, a request to access an optical sensor of the AR device, wherein input from the user is used to approve the request to access the optical sensor of the AR device;
      receive, over the secure connection and after approval of the request via the input from the user, an indication of a hand gesture performed by the user and captured by the optical sensor of the AR device;
      determine, based on the hand gesture, a corresponding input key of the front-end device; and
      perform an action based on the corresponding input key.

2. The system of claim 1, wherein the indication of the hand gesture comprises at least one image representing a hand of the user.

3. The system of claim 1, wherein the indication of the hand gesture comprises a vector indicating a set of coordinates and a direction associated with a hand of the user.

4. The system of claim 1, wherein the one or more processors are further configured to:
   receive a physical card associated with the user,
      wherein the AR device is identified based at least in part on verifying the physical card.

5. The system of claim 1, wherein the action comprises processing an alphanumeric input.

6. The system of claim 1, wherein the action comprises a transaction associated with an account of the user.

7. A method of configuring and using augmented reality at a front-end device, comprising:
   receiving, at the front-end device and from an augmented reality (AR) device associated with a user, a request to use the front-end device;
   transmitting, to the AR device, a request to access an optical sensor of the AR device wherein input from the user is used to approve the request to access the optical sensor of the AR device;
   receiving, from the AR device and after approval of the request via the input from the user, an output from the optical sensor, wherein the output indicates a hand gesture performed by the user and captured by the optical sensor of the AR device;
   determining, based on the hand gesture, a corresponding input key of the front-end device; and
   performing an action based on the corresponding input key.

8. The method of claim 7, further comprising:
   receiving, from the AR device, an authorization to receive the output from the optical sensor of the AR device.

9. The method of claim 7, wherein determining the corresponding input key comprises:
   projecting a direction of a hand of the user toward at least one surface of the front-end device; and
   determining the corresponding input key based on the direction.

10. The method of claim 7, further comprising:
    transmitting, to the AR device, a personal area network pairing message in response to the request; and receiving, from the AR device, a response to the personal area network pairing message.

11. The method of claim 7, wherein the output comprises at least one image representing one or more surfaces of the front-end device, a hand of the user, and at least one overlay.

12. The method of claim 7, wherein the AR device comprises a smart phone or a set of AR glasses.

13. The method of claim 7, wherein the front-end device comprises an automated teller machine (ATM).

14. A non-transitory computer-readable medium storing a set of instructions for configuring and using augmented reality at a front-end device, the set of instructions comprising:
one or more instructions that, when executed by one or more processors of a device, cause the device to:
transmit, to the front-end device and from an augmented reality (AR) device associated with a user, a request to use the front-end device;
establish a secure connection with the front-end device;
display an augmented image of the front-end device to the user;
receive, from the front-end device, a request to access an optical sensor of the AR device;
receive, from the user, input approving the request to access the optical sensor;
capture, using the optical sensor, a representation of a hand gesture performed by the user of the AR device;
transmit, to the front-end device and based on the input approving the request to access the optical sensor, an indication based on the representation of the hand gesture, wherein the indication is associated with a corresponding input key of the front-end device; and
perform an action based on the corresponding input key.

15. The non-transitory computer-readable medium of claim 14, wherein the action comprises verifying a personal identification number (PIN) based on the corresponding input key, and the one or more instructions, when executed by the one or more processors, further cause the device to:
capture, using the optical sensor of the AR device, a representation of an additional hand gesture performed by the user of the AR device;
transmit, to the front-end device, an additional indication based on the representation of the additional hand gesture, wherein the additional indication is associated with an additional corresponding input key of the front-end device; and
perform an additional action based on the additional corresponding input key.

16. The non-transitory computer-readable medium of claim 14, wherein the AR device has a wireless connection with the front-end device.

17. The non-transitory computer-readable medium of claim 14, wherein the AR device has a wired connection with the front-end device.

18. The non-transitory computer-readable medium of claim 14, wherein the augmented image comprises an image showing at least one surface of the front-end device, a hand of the user, and a projection of the hand onto the at least one surface.

19. The non-transitory computer-readable medium of claim 14, wherein the one or more instructions, that cause the device to transmit the request to use the front-end device, cause the device to:
transmit the request including at least one credential associated with the user.

20. The non-transitory computer-readable medium of claim 14, wherein the AR device comprises a phone, a set of AR glasses, or another type of device that provides a display with an augmentation.

* * * * *